April 9, 1957 R. C. INGRAHAM 2,788,475

SEALED SEMICONDUCTOR DEVICE

Filed Feb. 20, 1953

INVENTOR
ROBERT C. INGRAHAM
BY Paul S. Martin
ATTORNEY

United States Patent Office 2,788,475

Patented Apr. 9, 1957

2,788,475

SEALED SEMICONDUCTOR DEVICE

Robert C. Ingraham, Danvers, Mass., assignor to Sylvania Electric Products Inc., a corporation of Massachusetts Application February 20, 1953, Serial No. 338,002

1 Claim. (Cl. 317—236)

Figure 1:
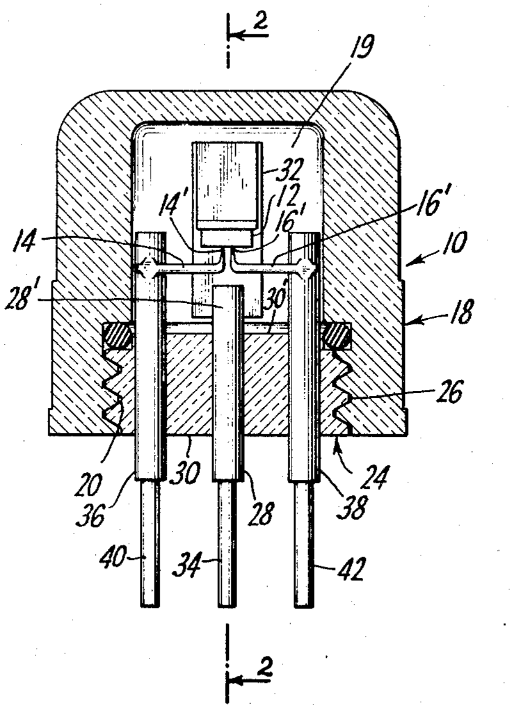

The present invention relates to fabrication of semiconductor devices, more particularly to semiconductor devices employing an O-ring seal.

With the adoption of rectifying-contact semiconductor devices for a variety of commercial applications, the need has developed for fabricating techniques by which desired semiconductor characteristics may be obtained in a manner compatible with mass production at low unit cost. Prominent among the desired characteristics for successful semiconductor operation is long term stability, which in part depends upon an envelope or enclosure affording protection against cycling of the atmosphere entrapped in the unit with changes in the ambient pressure, with ensuing atmospheric attack on the relatively sensitive semiconductor. As to the manufacturing aspect, it is desirable to initially have a high yield of standard units which will not fail with aging, and to fabricate by procedures facilitating reprocessing of defective units and allowing for salvage of most component parts.

In a typical manufacture of semiconductor translators and transducers, one or more point contact elements are arranged in contact with a semiconductor element. These elements are provided with a casing rendered airtight by various sealing arrangements. For example, resort has heretofore been made of heat sealing, cellulose base cements, force fits, and integral cast plastic casings, all for effecting assembly and sealing of the units. Numerous difficulties have been encountered with those, among them, the production of leaky and faulty joints allowing atmospheric attack of the units and rendering same sensitive to atmospheric pressure changes; difficulty of protecting the delicate semiconductor during heat sealing; the tendency of cellulose base cements and certain plastics to absorb and transmit moisture; the difficulty of salvaging and replacing faulty components; and the need for complicated jigs and fixtures that are tied up for a long time in assembling each unit, especially when casting integral plastic casings. The entire problem is rendered still more complicated when it is considered that most semiconductor units are tiny, the maximum case dimension being frequently less than 3/8 inch.

Accordingly, it is an object of the present invention to provide novel semiconductor devices of simplified physical construction obviating one or more of the aforesaid disadvantages. In particular, within the contemplation of the present invention is the provision of rectifying-contact devices adapted to manufacture by mass production methods and susceptible to readjustment, and to salvage when necessary, without detracting from stability or the obtaining of desired semiconductor properties.

In accordance with one aspect of the invention, an improved semiconductor device is provided in which the rectifying contact and semiconductor elements are mounted within a bipartite casing including a hollow body having a removable plug. An O-ring seal cooperates with the body and plug to render the bipartite housing air tight to achieve desired semiconductor operation. The use of the bipartite housing with the O-ring seal renders the unit independent of all the troublesome factors incident to the use of the mentioned types of seals heretofore employed. As applied to the present problem, and identified with volume production of miniature units, the O-ring seal is a substantial departure from known applications as in cumbersome laboratory equipment, including demountable cathode ray tube systems connected to vacuum tube pumps.

Figure 2:
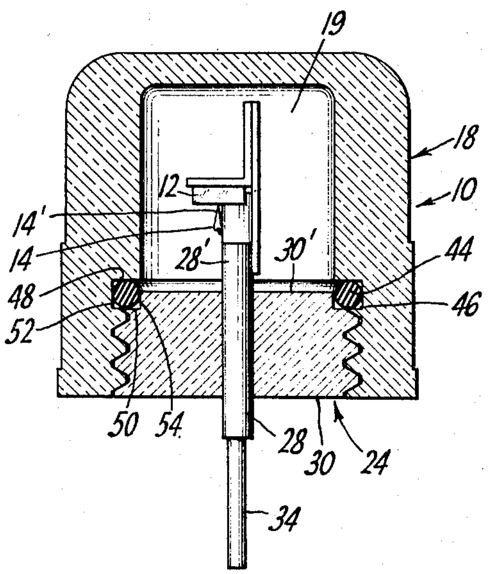

The nature of the invention will be best appreciated from the following detailed description of an illustrative embodiment, when taken in conjunction with the accompanying drawing, wherein:

Fig. 1 is one cross-sectional elevation of an illustrative transistor embodying features of the present invention; and Fig. 2 is another cross-sectional elevation along the line 2—2 in Fig. 1, looking in the direction of the arrows.

Although the invention has been illustrated in connection with a transistor unit or semiconductor triode, it is to be expressly understood that other applications are contemplated, as and for example, diodes for rectification, and photo-detectors. In the drawing, a bipartite envelope or casing 10 fabricated as of glass or equivalent moisture-proof plastic, is arranged to receive properly supported semi-conductor and point-contact rectifying elements, respectively designated by the numerals 12, 14, 16. The envelope 10 includes a dome-shaped body 18 having an internal chamber 19 accommodating the point contact and semi-conductor elements, the chamber 19 opening through a cylindrical, internally-threaded opening or mouth 20. For some applications hollow body 18 may be of metal.

Within the internally threaded mouth 20 of the body 18, there is supported a removable plug or circular base 24 having its outer periphery provided with threads 26, fitting into threaded mouth 20. Integrally molded with the plug or base 24, of glass or of equivalent moisture-proof insulating material is an axially disposed lead 28 projecting from opposite faces 30, 30′ of the plug 24. The end of the lead 28 internally of the body 16 and projecting from the face 30′ carries an elongated flat plate 32, either integrally or welded in place, which extends normal to the face 30′ of the base 24. The end of the lead remote from the plate 32 is integrally formed with a reduced pin or terminal prong 34 which may serve to provide suitable circuit connections to the lead 28, while minimizing transmission of mechanical stress to plug 24.

The plug or base 24 is additionally molded with a pair of spaced leads 36, 38 arranged parallel to and aligned in opposite sides of the lead 28. Leads 36, 38 include ends projecting from the under or lower face 30 of the base which are formed with reduced pins or prongs 40, 42 serving along with the pin or prong 34 as plug-ins or terminals for connection to the desired circuits. The ends of the leads 36, 38 projecting into the chamber 19 carry the point contact elements 14, 16 formed of transversely extending resilient whiskers of appropriate metal and having prepared pointed ends 14′, 16′ biased against the adjacent prepared surface of the semiconductor body 12. The prepared points 14′, 16′ are laterally spaced and aligned and in critical pressure engagement with the semiconductor element 12, as seen in the drawings. The prepared points are arranged in a plane and exert thrust in a line offset and parallel to the plate 32 and in position for contact with the semiconductor surface which is arranged normal to the plane of the point contact elements. The mounting of the semiconductor and point contact elements on the base 24 may be accomplished with the equipment disclosed and in accordance with the techniques described in my pending application Serial No. 299,805, filed on July 7, 1952.

In order to provide an effective hermetically sealed unit, an O-ring seal 44 of a suitable deformable elastomer material, such as natural rubber and synthetics including butyl rubber, is interposed between the body 18 and the removable plug 24. The O-ring seal 44 is received within an annular channel 46 having a cross-section substantially commensurate with the initial cross-section of the O-ring seal 44 before the O-ring is deformed. The annular channel is defined by a shoulder or seat 48, provided on the body 18 at the inner end of threaded mouth 20; an opposite shoulder or ledge 50 provided on the plug or base 24; a first axially extending constraining wall 52 provided on the body 16 and extending normal to the shoulder 48; and a second axial constraining wall 54 on plug 24 opposite to the wall 52 and 50 provided on the plug. The cross-section of this channel is reduced as the plug is screwed deeper into the hollow body.

In Figs. 1 and 2 the plug 24 is illustrated in its partly inserted position in which the O-ring is not deformed, the O-ring being compressed and sharply deformed by further screwing the plug 24 into the domed body 18 so as to provide a hermetic seal between the plug and body. Since the leads 28, 36 and 38 are integrally molded with the plug, there is no possibility of leakage at these points and accordingly the point contact and semi-conductor elements within the chamber 19 are completely protected from the external atmosphere.

Semiconductor devices, such as the illustrative transistor unit, are processed in substantially the following manner:

The circular insulating plug or base 24 of the bipartite housing 10 is integrally molded with the aligned pin leads 28, 36, 38. Initially, the mounting of the point contact elements 14, 16 in proper contact with the semiconductor element may be carried out with the aid of appropriate magnifying shadowgraph equipment and in accordance with the process outlined in my copending application referred to above. When the desired electrical characteristics are attained, the hollow body 18 is applied and tightened as with a torque wrench. This sealing operation avoids exposing the semiconductor to heat or to cement and plastic solvents, yet the hermetic seal is effected such as is not attained with tight fits or like mechanical seals. During the sealing operation there is no need for complicated jigs or fixtures nor is any equipment occupied for long as would be the cease in cast-plastic casings. In the event that certain units are defective, it is easy to reopen the hermetic seal provided through the cooperating plug 24 of the body 18 and the O-ring 44 for the purposes of salvage, adjusting, inspecting or for a used body 18 and O-ring 44 is useable without treatment after rejection of a defective plug assembly.

In order to test the effectiveness of the hermetic seal provided by following the teachings of the present invention, a number of the illustrative transistor units were immersed in a fluorescent dye and subjected to relatively high pressures. After several days of immersion under high pressure, these units were removed and no dye whatsoever, had penetrated to the interior of the units. The investigation of the units for dye penetration was carried out with an appropriate black light and it was established that the joint between the plug 24 and the body 16 was completely effective to eliminate leakage heretofore found to be one of the most troublesome factors in the assembly of semiconductor devices.

While in accordance with the provisions of the statutes, I have illustrated and described the presently preferred form of my invention, it will be apparent to these skilled in the art, that changes may be made in the device disclosed without departing from the spirit of the invention as set forth in the appended claim, and that in some cases, certain features of my invention may be used to advantage without a corresponding use of other features.

What is claimed is:

A semiconductor device comprising a bipartite casing including a hollow body and a removable plug, semiconductor and point contact elements arranged within said hollow body and engageable in a contact region, leads for said elements extending in one direction from said contact region and sealed through said removable plug, an O-ring tightly confined between said body and plug and providing a hermetic seal therebetween, and cooperating means on said body and said plug for mechanically joining same together, said cooperating means comprising an internal threaded mouth on said body and a complementary thread on the periphery of said plug.

References Cited in the file of this patent

UNITED STATES PATENTS

| | | |
|---|---|---|
| 1,691,806 | Holland | Nov. 13, 1928 |
| 1,721,681 | Angell | July 23, 1929 |
| 2,538,593 | Rose | Jan. 16, 1951 |
| 2,595,475 | McLaughlin | May 6, 1952 |
| 2,624,836 | Dicke | Jan. 6, 1953 |
| 2,713,133 | Ostapkovich | July 12, 1955 |

FOREIGN PATENTS

| | | |
|---|---|---|
| 684,285 | Great Britain | Dec. 17, 1952 |